June 6, 1961 T. H. BONN 2,987,708

MAGNETIC GATES AND BUFFERS

Filed Aug. 15, 1955 4 Sheets-Sheet 1

INVENTOR.
THEODORE H. BONN

BY

Charles C. Engfield

AGENT

June 6, 1961 T. H. BONN 2,987,708

MAGNETIC GATES AND BUFFERS

Filed Aug. 15, 1955 4 Sheets-Sheet 2

INVENTOR.
THEODORE H. BONN
BY
Charles C. Englisch
AGENT

INVENTOR
THEODORE H. BONN
BY Charles G. English
AGENT

INVENTOR.
THEODORE H. BONN
BY
Charles C. English
AGENT

United States Patent Office 2,987,708

Patented June 6, 1961

2,987,708

MAGNETIC GATES AND BUFFERS

Theodore H. Bonn, Philadelphia, Pa., assignor to Sperry Rand Corporation, New York, N.Y., a corporation of Delaware Filed Aug. 15, 1955, Ser. No. 528,463
16 Claims. (Cl. 340—174)

This invention relates to magnetic gates and buffers and more particularly to magnetic gates and buffers suitable for use in connection with computing and data translating systems.

It is at present commonplace to utilize vacuum tubes as the controlling elements of electronic computers and data translating systems. Some engineers have, however, developed, at least partially, computing systems employing magnetic amplifiers as the principal components. In several of my prior applications I have proposed to use magnetic gating and buffing in this connection. In other words, the computing or data translating would be carried out by the interconnection of a large number of magnetic gates and buffers. In general, the magnetic gates would feed buffers which would in turn feed other gates, which would feed other buffers, etc., until a complete system was established. It is the primary object of this invention to produce an improved magnetic gate and an improved magnetic buffer which may be used in such a complete system. In a complete system involving a very large number of magnetic gates and buffers in series, there is a loss of power as the signals proceed through the system. Unless each magnetic gate and/or buffer has sufficient gain to overcome any losses, the system will not be practical.

Another object of the invention is to provide a magnetic gate and/or buffer with more gain than has previously been available.

Still another object of the invention is to provide a magnetic gate and/or buffer which is simple in construction and effective in operation.

Another object of the invention is to provide a magnetic gate and/or buffer which is more reliable than other similar devices.

Other objects of the invention will appear as this description proceeds.

Briefly speaking, the invention employs a core with two coils thereon, one of which is fed by spaced pulses and its output terminates in a load. The other coil controls the impedance of the first-named coil. This control is effected by varying the impedance across the second coil. Any of a plurality of devices may be used to control the impedance of the second coil and thereby control the impedance of the first coil. In a magnetic buffer there is one core with the two coils thereon. The first (or control) coil has a plurality of switches shunted across the same and if any one of these switches is closed, the control coil has low impedance which gives the second (or power) coil low impedance and thus allows a large current to flow from the pulse source to the load. The switches across the control coil may be of any well known electronic type such as a transistor, gas tube, etc.

In the magnetic gate, there are a plurality of cores, one for each input. Each core would have a power winding and a control winding thereon. The power windings are connected in series with the source of pulses and the load, and each control winding is shunted by its input switch. Here again the input switch may be any well known electronic device such as a transistor or gas tube. If any one of the switches remains open the power winding controlled by that switch will have high impedance and no current will flow from the source to the load. If all switches are closed all power windings have low impedance. Hence, a gating action is achieved.

Figure 1:
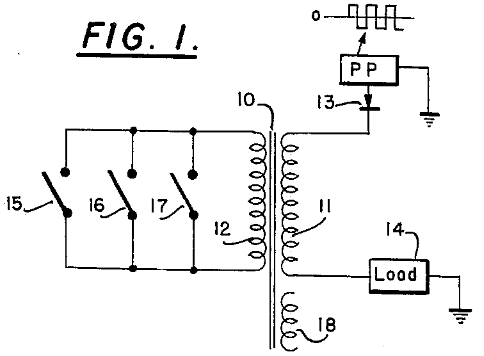
FIGURE 1 is an elementary schematic diagram of a magnetic buffer constructed according to the invention.
Figure 3:
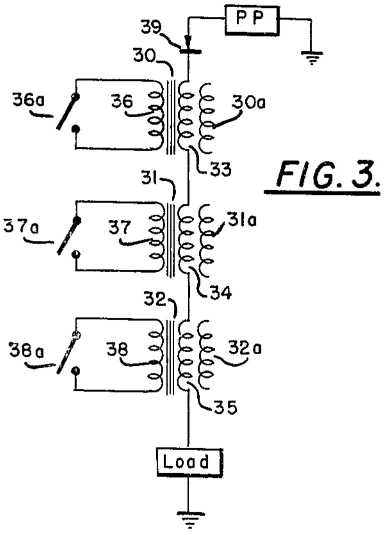
FIGURE 3 is an elementary schematic diagram of a magnetic gate according to the invention.

The invention, in its simplest terms, is illustrated in FIGURES 1 and 3 which, respectively, show elementary forms of magnetic gates and buffers according to the invention. In FIGURE 1, a source of square wave alternating current power pulses PP is employed. Many of the other figures contemplate a similar source, and wherever a block labled PP appears in this specification, it corresponds to the block shown in FIGURE 1. The waveform is not necessarily square, since sine waves, for example, may be used. The core 10 may be made of any material having a substantially rectangular hysteresis loop, or it may have a substantially linear B—H curve over the portion thereof where it operates.

In FIGURE 1, the latter type of core is assumed. A power winding 11 and a control winding 12 are on the core. Positive excursions of source PP flow through rectifier 13, power winding 11 to load 14. Switches 15, 16 and 17 are respectively shunted across control winding 12. If all three of these switches remain open, coil 12 does not tend to retard rapid rate of change of flux in core 10 and consequently, coil 11 will present high impedance to the flow of pulses from source PP to the load 14. In event any one or more of switches 15 to 17 inclusive are closed, coil 12 will be shorted, will oppose change of flux in the core 10 and will therefore cause coil 11 to present low impedance to the pulses from source PP to the load 14. Hence, the device is in effect a magnetic buffer because if any one of the three input switches 15, 16 or 17 is closed, pulses will flow from source PP to load 14. In an actual buffer, as used in a computer, there would normally be plural power windings on each core and hence supplementary power winding 18 is shown. It may be connected in series with source PP and another load, or it may be energized from a separate pulse source. Any number of power windings may be located on the core and may be controlled by the same or different pulse sources as desired, and may all feed one, or may all respectively feed separate, loads, depending on the circuit of the over-all system.

The device of FIGURE 1 may also be regarded as a magnetic gate since in some particular cases "O" (or no output) is the desired output representative of particular information. To produce this output condition, all switches 15, 16 and 17 must be open concurrently. Any gate may, under different circumstances, be regarded as a buffer, and vice versa. Hence, these terms more accurately represent the way in which the circuit is connected and used, and do not differentiate between the circuits themselves. All of the circuits, herein described, can be either a gate or a buffer as desired and use of either of these terms is intended to be generic so as to include the other.

Figure 2:
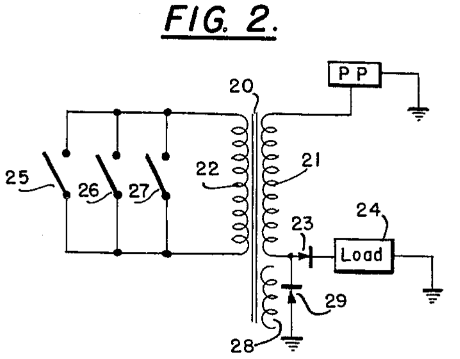
FIGURE 2 is a modified form of magnetic buffer according to the invention.

FIGURE 2 is a modified form of the invention, wherein the core 20 has a substantially rectangular hysteresis loop. Positive pulses from source PP flow through power winding 21, rectifier 23 to load 24 when the coil 21 has low impedance. In event coil 22 is not shunted by any of the switches 25, 26 or 27, the coil 21 has high impedance. If, however, one of the switches is closed, coil 22 opposes change of flux in the core 20 and coil 21 has low impedance, allowing the pulses to flow to the load. Where rectangular hysteresis loop material is used, it is readily possible for the source PP to drive the core up the hysteresis loop and thus give the coil 21 low impedance even though none of the switches are closed. To avoid this, the core is reset to negative remanence during the negative excursions of source PP since these excursions may flow through coil 21 and rectifier 29 to ground. Hence, on positive halves of the cycle the core is driven from negative remanence up the hysteresis loop and on negative halves of the cycle the core is driven back to negative remanence. One or more additional coils 28 may be placed on the core and controlled by the source PP, or by another source, and may feed load 24 or one or more other loads, all as previously described in connection with FIGURE 1.

FIGURE 3 illustrates an elementary magnetic gate according to the invention. Three cores 30, 31 and 32 having a linear B—H curve respectively have power windings 33, 34 and 35 and control windings 36, 37 and 38. Switches **36*a*, 37*a* and 38*a* are respectively shunted across the three control windings. In event all three switches are closed, all three power windings will present low impedance to pulses from source PP and current will flow therefrom through rectifier 39 to the load. If any one of the switches, for example switch 36*a*, is open, its complementary power winding (for example 33) will have high impedance and substantially no current will flow to the load. As a result, the only condition whereby current will flow from source PP to the load is that all three switches are simultaneously closed. Additional coils 30*a*, 31*a* and 32*a*** have been shown associated with the respective cores but these coils may be omitted. They are shown to represent the fact that any number of power windings may be placed on any one core and these power windings may be connected in series with each other or in series with power windings of another gate, or in series with power windings of several gates, or in any other suitable fashion as desired.

Figure 4:
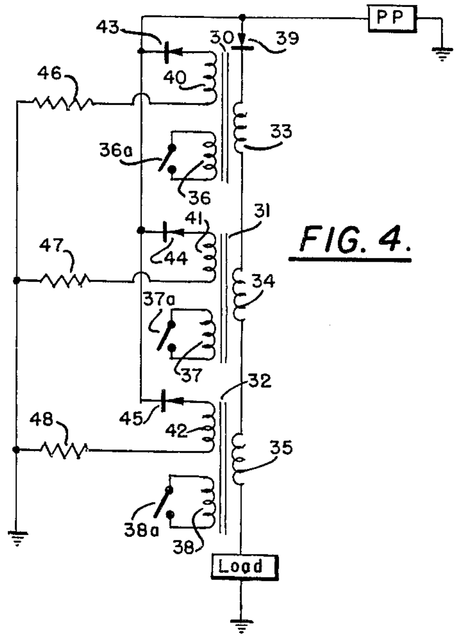
FIGURE 4 is a modified form of magnetic gate according to the invention.

FIGURE 4 is the same as FIGURE 3 in all respects except that here rectangular hysteresis loop material is contemplated and consequently it is desirable to return each core to negative remanence during the negative half cycles of source PP. This is accomplished by coils 40, 41 and 42 respectively in series with rectifiers 43, 44 and 45. During negative excursions of source PP current flows through these rectifiers and coils and thence through resistors 46, 47 and 48 to ground. This returns each core to negative remanence during the negative excursions of the source PP.

Figure 5:
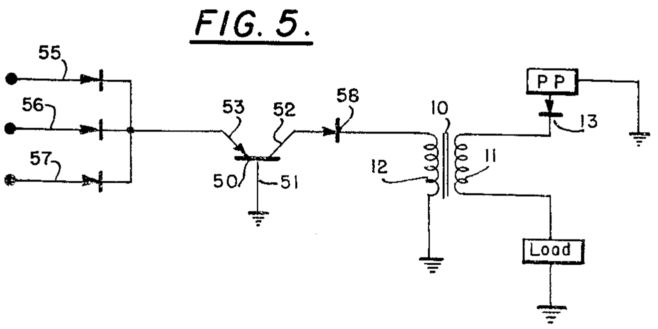
FIGURE 5 is a more complete schematic diagram of a magnetic buffer according to the invention.

FIGURE 5 shows an improvement upon FIGURE 1 in which electronic means is employed in the place of the three manual switches 15, 16 and 17. Otherwise the construction and mode of operation of the two figures is the same. A transistor 50 having a grounded base electrode 51, a collector electrode 52 and an emitter electrode 53 is employed. The collector electrode 52 is connected through rectifier 58 to the upper end of coil 12 so that in effect the coil 12 is shunted by the collector and base electrodes. Three input terminals 55, 56 and 57 are connected through rectifiers to the emitter electrode 53. In event a signal appears at any one or more of the inputs 55, 56 or 57, the emitter is energized, the transistor has low impedance and the coil 12 is effectively short circuited whereby coil 11 has low impedance to the pulses flowing from source PP to the load. In event none of the three inputs 55, 56 or 57 is energized, the transistor presents high impedance across the coil 12 and hence coil 11 has high impedance to any flow of pulses from source PP to the load.

Figure 6:
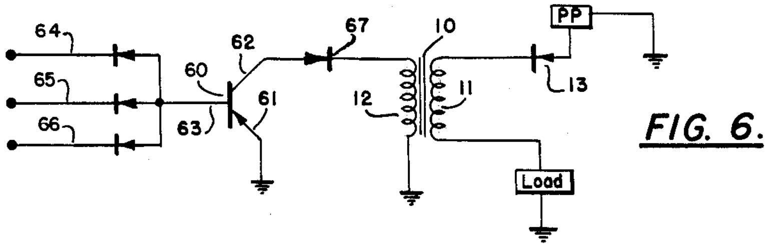
FIGURE 6 is a modified form of magnetic buffer according to the invention.

FIGURE 6 is a further modified form of the invention in which the transistor 60 has a grounded emitter 61. It also has a collector electrode 62 and a base electrode 63. Inputs 64, 65 and 66 are fed through rectifiers to the base electrode 63. Rectifier 67 is connected between coil 12 and collector electrode 62. In event no signal appears at any of the inputs 64, 65 or 66, the collector and emitter electrodes which are respectively connected across coil 12 do not have any substantial shunting effect and hence coil 11 has high impedance and no current flows to the load. If any one or more of the inputs 64 to 66 have a negative-going signal thereon, the transistor forms a low impedance shunt across coil 12, whereby coil 11 has low impedance to the flow of pulses from source PP to the load.

Figure 7:
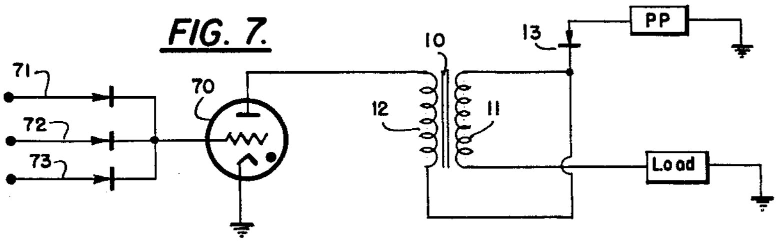
FIGURE 7 is a further modified form of a magnetic buffer according to the invention.

FIGURE 7 is a further modified form of the invention identical in all respects with FIGURE 1 except as follows. A gas tube 70 has its anode connected to one end of coil 12 and its cathode grounded. The gas tube is controlled by three inputs 71, 72 and 73. In the absence of any input signals, the gas tube has high impedance and consequently coil 11 presents high impedance to flow of current from source PP, rectifier 13, coil 11 to the load. In event one or more of the inputs 71, 72 or 73 is energized, the gas tube begins to conduct in response to the next positive excursion of source PP, the current flowing from source PP, rectifier 13, coil 12, through the gas tube 70 to ground. The gas tube thus becomes conducting and forms a low impedance shunt across the coil 12, thereby causing coil 11 to have low impedance to the pulses flowing therethrough. Hence a positive-going pulse flows from source PP to the load, and the next negative-going pulse of source PP extinguishes the gas tube 70. It is noted that a vacuum tube whose anode was connected to the positive side of a D.C. source could replace gas tube 70. In that case the lower end of coil 12 would be grounded instead of being connected to rectifier 13.

Figures 8, 9:
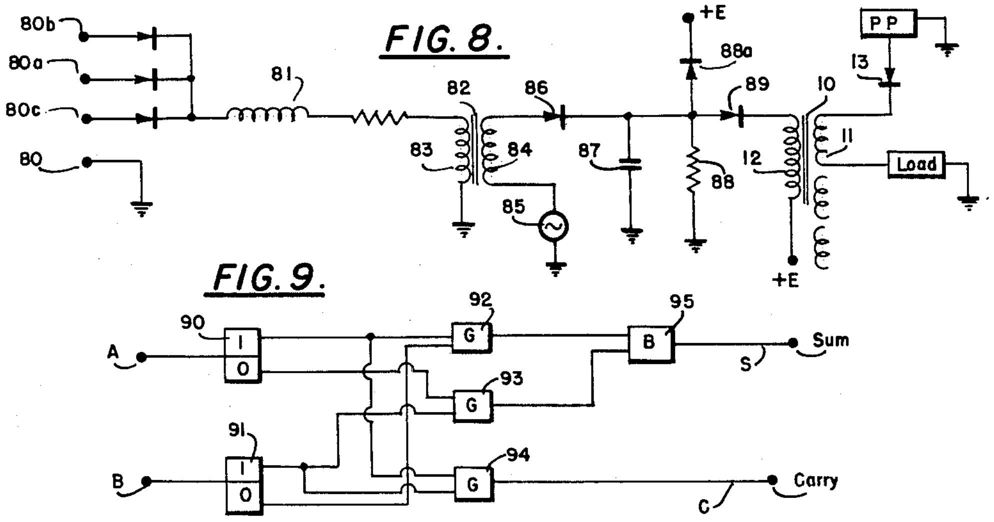
FIGURE 8 is a still further modified form of a magnetic buffer according to the invention.
FIGURE 9 is a block diagram of a half adder built up of magnetic gates and buffers herein described.

FIGURE 8 is a magnetic buffer in which the parts 10, 11, 12 and 13 correspond to similar parts of FIGURE 1. Here the shunting of the control coil 12 is effected by a carrier type magnetic amplifier. This magnetic amplifier has one grounded input terminal 80 and three other input terminals **80*a*, 80*b* and 80*c*. Signals received on any one or more of the three inputs flow through filter 81, of any suitable type but shown as an inductor, to the primary 83 of the transformer 82. This transformer has a power winding 84 in series with a high frequency source 85. Source 85 has very high frequency as compared to the frequency of the pulses of source PP and also as compared to the signals received at the inputs. In event positive input signals appear at one or more of the inputs 80*a*, 80*b*** or 80c, they flow through coil 83 during the spaces between positive excursions of source 85 and revert the core to negative remanence during those spaces. Since the input signals are steady and of longer duration than the signals of source 85, these signals will also appear during the positive excursions of source 85 but this plays no part in the description of the device and need not be mentioned. During positive excursions of source 85, the flow of current from the source through rectifier 86, resistor 88 to ground will tend to apply a positive magnetomotive force to the core 82 driving it from negative to positive remanence. Hence on positive excursions of source 85 the core will be driven to positive remanence and on negative excursions it will be driven by the input signal to negative remanence. As a result, the core will traverse the hysteresis loop without saturating the core. Hence the flow of current through rectifier 86 and resistor 88 will be small. This means that each positive excursion of source PP, flowing through coil 11, to the load, may induce a potential in coil 12 which renders the upper end of this coil highly negative with respect to +E but slightly positive with respect to ground, but since the current flowing through resistor 88 is small, the anode of rectifier 89 is essentially grounded; hence, the rectifier 89 will pass no current. In effect, therefore, coil 12 does not have a low impedance shunt across it and coil 11 has high impedance to flow of pulses from source PP to the load.

If, however, no signal is received at any of the three inputs 80a, 80b or 80c, no current will flow in coil 83. Hence the repeated positive excursions of source 85 flowing through coil 84 will drive core 82 to saturation and a large current will flow through rectifier 86 and resistor 88. The potential at the upper end of resistor 88 will tend to be raised above the value +E and therefore current will flow through rectifier 88a to source +E and thus limit the potential at the upper end of resistor 88 to the value +E. The potential across resistor 88 is smoothed out by condenser 87. It is clear now, that both ends of coil 12 are effectively at a potential of +E volts and therefore the coil is effectively short circuited. Consequently coil 11 has low impedance to flow of pulses from source PP to the load. In event it is desired for this device to operate as a buffer, some changes in operation are required. As is apparent from the previous figures, a buffer is a device where input signals at any one input will cause a signal at the output, whereas in FIGURE 8 a signal at the input precludes a signal at the output. Any suitable means for reversing this process can be employed to make the device a buffer. For example, a positive bias can be placed on the input signal generators so that they normally produce a signal and in response to energization of the input, the bias is cancelled.

As will hereinafter appear, any of the electronic input circuits of FIGURES 5, 6 and 7 may be applied to any of the gates of FIGURES 3 and 4 to create magnetic gates. Hence the foregoing figures clearly describe how to produce magnetic gates or buffers.

FIGURE 9 is an explanation of a half adder using the aforesaid magnetic gates or buffers. Input circuits 90 and 91 have two inputs A and B respectively for receiving the signals to be added. Normally these signals are in the form of pulses. If a signal is received at either input alone, the sum output is energized. If neither input is energized, there should be no signal at either output S or C. If both inputs are simultaneously energized, there should be a signal at the carry output C but none at the sum output S. The circuits 90 and 91 (hereinafter more fully explained in FIGURES 10 and 12) are of a form where there are two outputs from the circuit, these outputs being respectively shown as emerging from the 1 and 0 side of the circuit. In event there is no input signal at A, there will be a signal from the 0 side of circuit 90 but no signal from the 1 side thereof. In event there is an input signal at A, there will be a signal from the 1 side of circuit 90 but no signal from the 0 side thereof. The same is true for circuit 91, that is, if there is no signal at input B there is an output from the 0 side of the circuit but none from the 1 side, and if there is a signal at input B, there is a signal from the 1 output side thereof but no signal from the 0 side thereof. Gate 92 receives signals from the 1 side of circuit 90 and from the 0 side of circuit 91. Gate 93 is fed from the 0 side of circuit 90 and the 1 side of circuit 91 while gate 94 is fed from the 1 side of circuit 91 and the 1 side of circuit 90. Buffer 95 has two inputs fed by gates 92 and 93.

In event there are no input signals at either A or B, none of the gates 92, 93 or 94 will allow flow of current therethrough, since at least one of the inputs of each gate is not energized. Hence there can be no output at either S or C. In event input A is energized and B is not, there will be a signal from the 1 side of circuit 90 and from the 0 side of circuit 91 thus energizing gate 92 and allowing current to flow therethrough to buffer 95. Since if either input of the buffer is energized there will be an output therefrom, there will be a sum output at S. Gate 94 is fed from the 1 side of circuit 91 and since there is no signal from that side of said circuit, no current will flow through gate 94 and there will be no carry output at C. In event input B is energized but input A is not, there will be signals from the 0 side of circuit 90 and the 1 side of circuit 91, thus energizing both the inputs of gate 93. At least one input of each of gates 92 and 94 will not be energized. Hence current may flow only through gate 93 and will feed buffer 95. Since if either input of that buffer is energized there will be a signal at its output, the sum output S will be energized, but the carry output C will not. In event both inputs A and B are energized, the 1 side of both circuits 90 and 91 will be energized, thus providing signals on both inputs of gate 94 allowing that gate to be conducting and producing a signal at carry output C. However, at least one of the inputs of each of gates 92 and 93 will not be energized and therefore there will be no signal from either of said gates and consequently no input to buffer 95 and no sum output at S.

Circuits 90 and 91 of FIGURE 9 may be of the type shown in the copending application of William J. Bartik, entitled "Electrical Circuit Having Two or More Stable States," Serial No. 504,974, filed April 29, 1955, now Patent No. 2,854,656; or of the type shown in the copending application of Theodore H. Bonn, entitled "Electrical Circuit With Two Stable States," Serial No. 497,548, filed March 29, 1955. Both of these applications disclose flip-flop circuits with set and reset inputs as well as two separate outputs. These circuits have two stable states. Energizing the set input places the device in the first stable state wherein there are pulses at the first output but none at the second output. The device remains in this stable state until the reset input is energized, whereupon pulses appear at the second output but not at the first.

Figure 11:
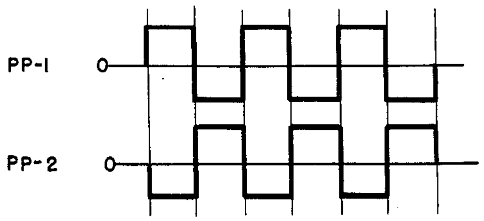
FIGURE 11 is a waveform diagram for the device of FIGURE 10.
Figure 10:
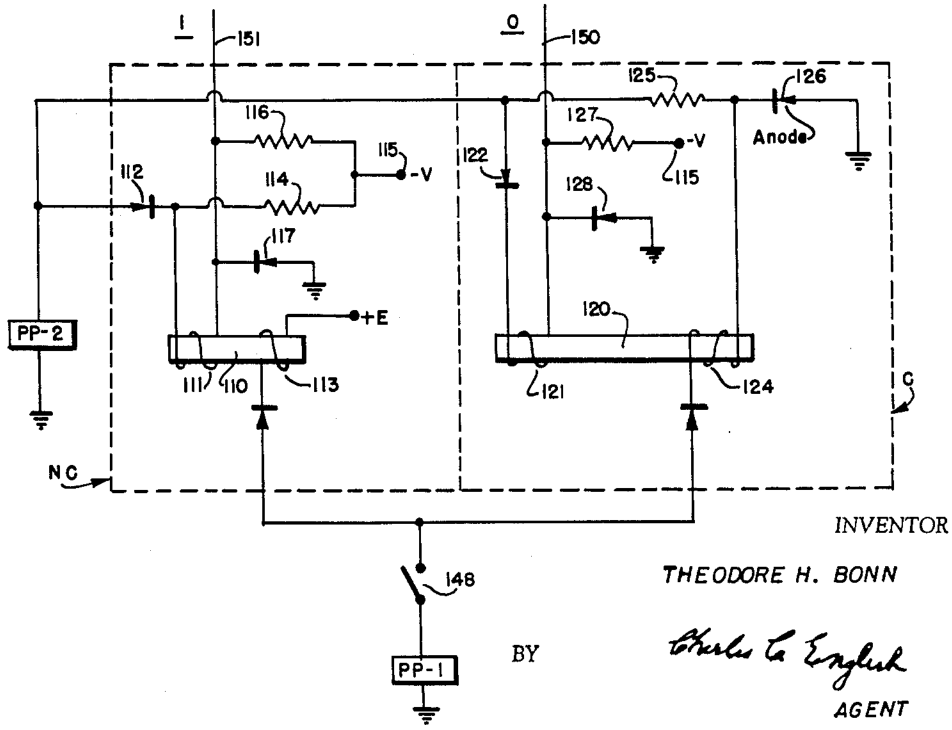
FIGURE 10 is a schematic drawing of one form of input switch that may be used for blocks 90 and 91 of FIGURE 9.

In some cases it is desirable to substitute for the circuits 90 and 91 shown in FIGURE 9, a modified form of circuit which has two outputs and only one input. When the input is energized, pulses appear only at the first output; and when the input is not energized, pulses appear only on the second output. The latter form of circuit is shown in FIGURE 10 wherein there is a non-complementing magnetic amplifier NC and a complementing magnetic amplifier C, both using square loop material and fed by a common input switch 148 connected to a source of square wave alternating current power pulses PP–1. The source PP–1 has positive excursions which occur during the spaces between the positive excursions of source PP–2, as shown in FIGURE 11. When switch 148 is closed, the operation is as follows. During the first positive excursion of source PP–1, a negative magnetizing force on core 110 is set up in coil 113. There is also a positive magnetizing force in the core resulting from flow of current from ground, rectifier 117, power winding 111, resistor 114, to negative source 115. These two magnetizing forces cancel and consequently the core remains at positive remanence. The next positive excursion from source PP–2 flows through rectifier 112, finds low impedance in coil 111 and therefore flows therethrough to output 151.

So long as switch 143 is closed, this operation continues. There is no output at 150 since pulses from source PP–1, flowing through coil 124, reset core 120 to negative remanence. Positive pulses from source PP–1 may flow through coil 124 since at the interval that these positive pulses occur, source PP–2 has gone negative and has caused a flow of current from ground through rectifier 126, resistor 125 to source PP–2. This has lowered the cathode of rectifier 126 to ground potential. Therefore there is a potential difference across coil 124. Since the core 120 is at negative remanence at the time the next positive excursion of source PP–2 occurs, current will flow from that source through rectifier 122, but will find coil 121 with high impedance since any current in that coil will necessarily tend to drive the core 120 from negative to positive remanence. Therefore the output current will be small and in fact will be neutralized by the sneak suppressor 115—127—128 which causes a small flow of current of substantially equal magnitude to the sneak current. Hence, when switch 148 is closed, pulses from source PP–2 will appear at output 151 but not at output 150.

If switch 148 is open, no current will flow in coil 113. Therefore during negative excursions of source PP–2 core 110 will be reset to negative remanence by flow of current from ground, rectifier 117, coil 111, resistor 114, to source 115. The next positive excursion of source PP–2 will therefore tend to drive core 110 from negative to positive remanence, whereby coil 111 will have high impedance and only a small current will flow through coil 111. This current will be neutralized by the sneak current suppressor 115—116—117, which causes a small flow of current to oppose that tending to flow through the coil 111. On the other hand, there will be output signals at 150 since the input coil 124 will not be energized and core 120 will remain at positive remanence. Therefore coil 121 will have low impedance and will allow the positive excursions of source PP–2 to readily flow therethrough.

Figure 12:
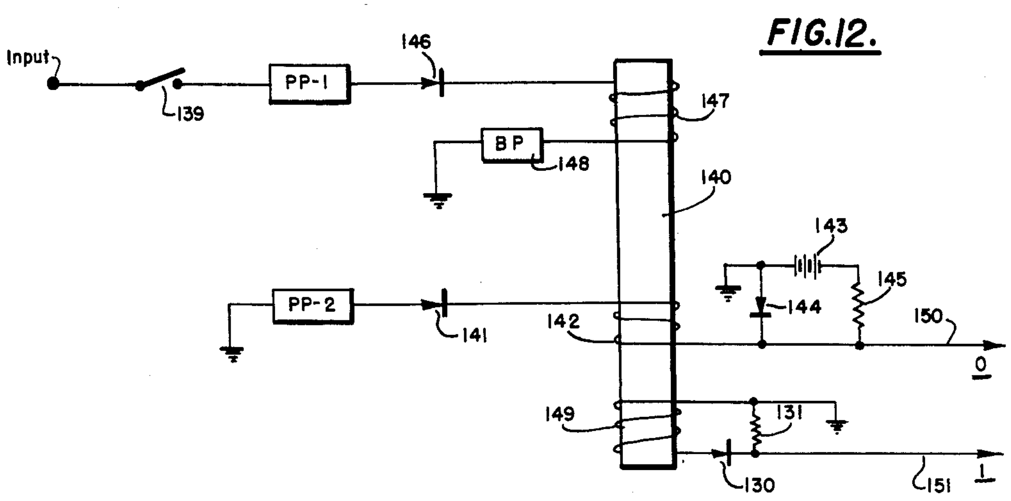
FIGURE 12 is a modified form of circuit that may be used for the blocks 90 and 91 of FIGURE 9.

Another form of input circuit is shown in FIGURE 12. This circuit has a core 140 (composed of material with a substantially rectangular hysteresis loop), a power winding 142, an output winding 149, and an input winding 147. Sources PP–1 and PP–2 are square wave alternating current sources which are out of phase with each other so that one goes positive when the other goes negative, all as shown in FIGURE 11. Blocking pulse generator 148 produces a train of positive pulses which occur in phase with (and of the same duration as) positive excursions of source PP–2. Source BP has no negative excursions.

Assume for purposes of illustration, that the core has remained at or above positive remanence for a substantial period of time, while switch 139 was open. In this situation, the operation of the device is as follows. Coil 147 is not energized. Every positive excursion of source PP–2 flows through rectifier 141, coil 142 to output 150. This drives the core from positive remanence to positive saturation. After each positive excursion of source PP–2 the core returns to positive remanence. There is a signal at output 150. There is very little change of flux in the core during these operations and no signal is induced in output coil 149 and no signal appears at output 151. If it now be assumed that switch 139 is closed so that the next positive pulse of source PP–1 flows through rectifier 146, coil 147 and blocking pulse generator 148, to ground, the action will be as follows, remembering that the positive excursion of source PP–1 occurred during an interval when the potential across blocking pulse generator 148 was zero and at a time when source PP–2 was negative and was therefore cutting off rectifier 141. Positive pulses from source PP–1, flowing through coil 147, will revert that core to negative remanence which will cause a rate of change of flux in coil 149; but since rectifier 130 is connected to oppose the flow of output current in this particular instance, no current flows through resistor 131 or to output 151. However, the next positive excursion of PP–2, flowing through rectifier 141 and coil 142, will tend to drive the core back from negative remanence to positive remanence. Coil 142 will have high impedance during this action and there will be a large rate of change of flux in core 140. Therefore a large induced potential in coil 149 will cause a flow of current through rectifier 130 and resistor 131, producing a pulse at output 151. The current flowing therethrough at this time will be small and it will be cancelled by the sneak suppressor 143—144—145. The battery 143 tends to cause a flow of current through the rectifier 144 and the resistor 145 equal and opposite to the sneak current tending to flow through coil 142, due to transformer action, and therefore cancels this current so that none of it appears at the output 150.

It is clear from the foregoing description, that when the input switch 139 is open, a pulse appears at output 150 but not at output 151. On the other hand, when switch 139 is closed, there will be a pulse at the output 151 but none at 150.

It is clear from the foregoing description that in the case of every binary signal fed into the input circuits 90 and 91 of Figure 9, both of these circuits will have output pulses timed to occur in synchronism with each other. This follows since all outputs of circuits 90 and 91 can only occur during positive excursions of source PP–2.

Figure 13:
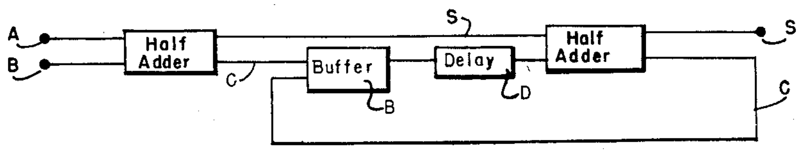
FIGURE 13 is a full adder built up of gates and buffers disclosed herein.

FIGURE 13 shows how two of the half adders of FIGURE 9 may be interconnected to form a full adder. A buffer B of the type shown in any of FIGURES 1, 2, 5, 6, 7 or 8 may be employed in connection with a suitable delay line D. Otherwise the circuit is obvious and those familiar with half adders and full adders can, from the preceding description, readily see how FIGURE 13 may be made to operate.

Figure 14:
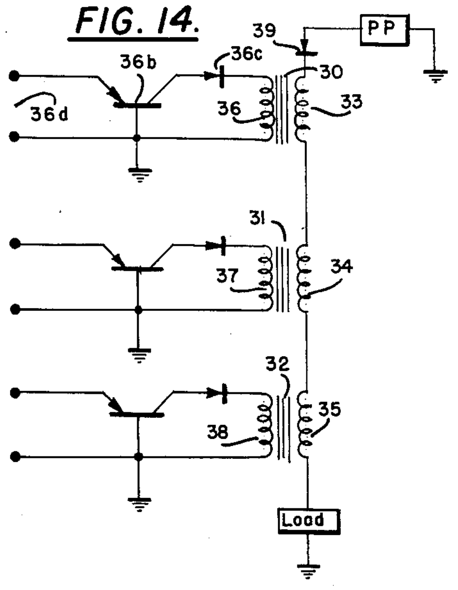
FIGURE 14 is a schematic diagram of a magnetic gate according to the invention.

FIGURE 14 is a modified form of FIGURE 3 showing how a transistor may be substituted for the input switch **36*a* of FIGURE 3. In FIGURE 14 a transistor 36*b* is connected through rectifier 36*c* across coil 36. The emitter electrode of the transistor is connected to the input 36*d* and the base electrode is grounded. The transistor is connected and operates very much the same way as described in connection with FIGURE 5. In FIGURE 14 the coil 33 has high impedance if there is no signal at the input 36*d*. Hence if any one of the three input circuits is de-energized, the gating circuit as a whole will have high impedance to the flow of pulses to the load. If all three inputs are energized, all three coils 33, 34 and 35 will have low impedance since all three control windings 36, 37 and 38** will be effectively short circuited. Consequently current will flow to the load.

Figure 15:
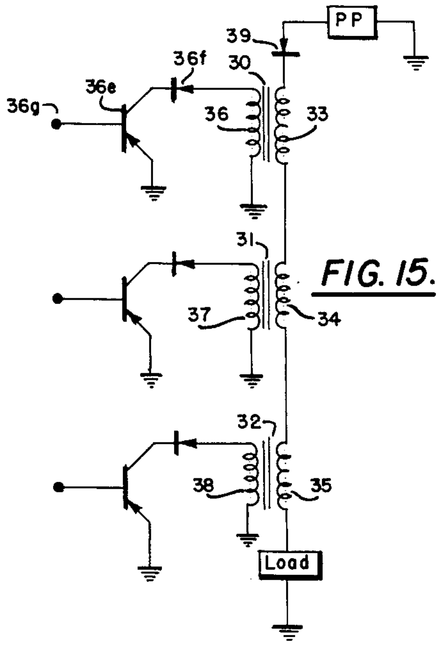
FIGURE 15 is a schematic diagram of a modified form of magnetic gate according to the invention.

FIGURE 15 is similar to FIGURE 14 except that the transistor is connected in a different way. Here the base electrode is connected to the input **36*g* and the collector electrode of the transistor 36*e* is connected through rectifier 36*f* to the coil 36. The emitter electrode is grounded. In the absence of signal at the input 36*g*, the coil 36 has high impedance. If an input signal appears at input 36*g*, the coil 36 has low impedance as does coil 33. Hence if all three inputs are energized, all three coils 33, 34 and 35** will have low impedance to the flow of current to the load, otherwise not.

Figure 16:
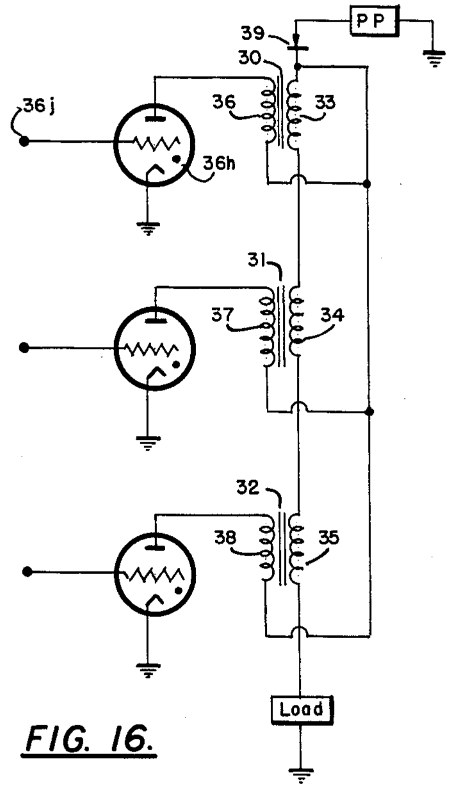
FIGURE 16 is a schematic diagram of a still further modified form of magnetic gate according to the invention.

FIGURE 16 illustrates a modified form of the invention employing gas tubes in the input circuits. The gas tube **36*h* has its grid connected to the input 36*j*, very much the same as in conjunction with FIGURE 7, and the description of the gas tube of FIGURE 7 applies equally to FIGURE 16. In event any one of the inputs is not energized, its complementary gas tube is not energized and its complementary control winding 36, 37 or 38 as the case may be, has high impedance and the complementary power winding likewise has high impedance. In event all three inputs are energized all three coils 36, 37 and 38 are effectively shunted and all three coils 33, 34 and 35** have low impedance to the flow of current to the load.

Figure 17:
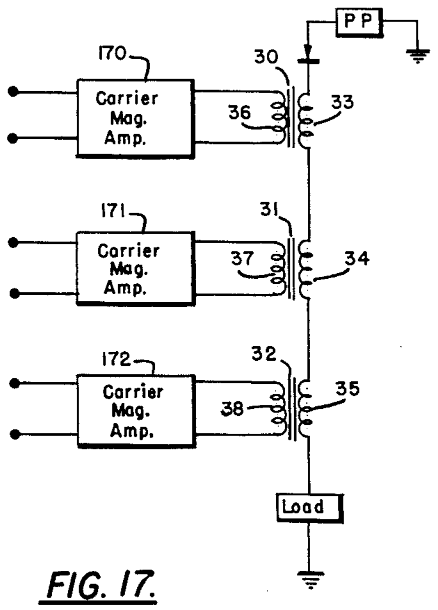
FIGURE 17 is a schematic diagram of yet another form of magnetic gate according to the invention.

FIGURE 17 is a modified form of FIGURE 3 in which three carrier type magnetic amplifiers 170, 171 and 172 are shunted across the input coils 36, 37 and 38. FIGURE 8 shows how the carrier type magnetic amplifier may be connected across the control windings 36, 37 and 38. In event all three inputs are so energized that the three control coils 36, 37 and 38 are effectively shorted, the three coils 33, 34 and 35 have low impedance and current flows to the load, otherwise not.

While a number of different forms of the invention have been shown, it is clear that various features of the different forms may be used in combination although this has not been shown in detail. For example, coils such as 30*a*, 31*a* and 32*a* may be used on any of the devices of FIGURES 14 to 17 inclusive. Likewise, the resetting coils 40, 41 and 42 may be so used. In addition, instead of all three inputs of a magnetic gate being controlled by the same type of electronic device, it is possible for one input to be controlled by a transistor as shown in FIGURE 14, another input to be controlled by a gas tube as shown by FIGURE 16, and a third controlled by a carrier type magnetic amplifier as shown in FIGURE 17.

As previously mentioned, devices embodying this invention are designed for use as components in a more complete computing or data translating system. In going from the input to the output of such a system, the signals would pass through hundreds or perhaps thousands of the gates and buffers as described above. If the devices did not have power gain, it is clear that the original signal would be reduced to such a small value that the device would fail to function long before the signal passed through the complete system. One of the important aspects of the invention is that the device has large power gain. For example, in FIGURE 1 it may require only a very small amount of manual energy to close the switch 15, yet this may cause a very large change in the current flowing through the power winding, assuming that the core 10 is large enough to give the power winding very high impedance when the switch 15 is open and very low impedance when the switch 15 is closed, and provided further that the pulse generator PP provides pulses of sufficient potential and power, and provided still further that the resistance of the load is properly matched to the impedance of the source. When electronic means is substituted for the manual switches 15, 16 and 17, the result is just the same. For example, if a transistor, gas tube, or carrier type magnetic amplifier is employed as the switching means, only a small amount of power is required to effectively short circuit the control winding. Once this control winding is effectively short circuited, the power winding will have low impedance and a very large current may be driven therethrough. If then the source of pulses has sufficient power and potential and the load has correct impedance, the power fed to the load may be many times that required at the input.

I claim to have invented:

1. A control system comprising a plurality of cores; coil means on each core; a source of pulses; a load; means for passing pulses from said source serially through at least a part of the coil means on each core to said load; a separate variable impedance device for each coil means, and a plurality of input sources, each of said variable impedance devices being effective to shunt at least a portion of its complementary coil means in response to an input from one of said input sources; said cores, said coil means on each core, said source, said load, the means for passing pulses, and the variable impedance devices, having such relative electrical characteristics that the system has power gain.

2. A control system comprising a plurality of cores; a power winding on each core; a control winding on each core; a load; a source of pulses; a series circuit including said source, said load and said power windings, a plurality of variable impedance control devices respectively shunted across said control windings, and a plurality of input sources operable individually to vary the impedance of separate ones of said devices; said cores, said power windings, said control winding, said load, said source and said variable impedance control devices having such relative electrical characteristics that a change in the power supplied by said input sources will cause a larger change of power delivered at the load.

3. A control system comprising a plurality of cores, a power winding on each core, a control winding on each core, a plurality of sources of independent input signals each being associated with one of said control windings, a separate transistor switching circuit connected between each of said sources of said input signals and the associated one of said control windings to receive input signals from the associated one of said sources and to produce in response thereto a low impedance across the associated one of said control windings, a load, a source of load current, and circuit means connecting said load, said source of load current, and said power windings in the same series circuit for producing an output in said load upon coincident occurrence of input signals from said sources of input signals.

4. A control system as recited in claim 3 wherein each of said transistor switching circuits includes a transistor, and a rectifier connected between an electrode of said transistor and a terminal of the associated one of said control windings.

5. A control system comprising a plurality of cores, coil means on each core, a source of pulses, a load, means for passing pulses from said source serially through at least a first part of the coil means on each core to said load, and a separate variable impedance device coupled to another part of the coil means on each core, the impedance of each of said variable impedance devices being effective during said pulses to change correspondingly the impedance offered by said first part of the associated one of said means to the flow of pulses from said source to said load.

6. A control system as defined in claim 5 in which each variable impedance device is a transistor.

7. A control system as defined in claim 5 in which each variable impedance device is a transistor having base, emitter and collector electrodes, the base and collector electrodes being connected to opposite ends of at least a part of the coil means, and an input connected to the emitter electrode.

8. A control system as defined in claim 5 in which each variable impedance device is a transistor having base, emitter and collector electrodes, the emitter and collector electrodes being connected to opposite ends of at least a part of the coil means, and an input connected to the base electrode.

9. A control system as defined in claim 5 in which each variable impedance device is a gas tube having an anode, a cathode and a control grid, the anode and the cathode being connected to opposite ends of at least a part of the coil means, and an input connected to said control grid.

10. A control system as defined in claim 5 in which each variable impedance device comprises a carrier type magnetic amplifier.

11. A control system comprising a plurality of cores, a power winding on each core, a control winding on each core, a load, a source of pulses, a series circuit including said source, said load and said power windings, a separate input circuit coupled to each of said control windings, said input circuits each including a variable impedance control device shunted across a corresponding control winding, the impedance of each of said control devices being one value during the absence of an input signal in said input circuits and a second value in response to the presence of an input signal, said core being operative to couple corresponding ones of said power windings and control windings so that the impedance offered by said power windings to said pulses is a function of said input signals.

12. A control system comprising core means, coil means on said core means, a pulse source, a load, means connecting said load in series with at least a part of said coil means and said pulse source, a plurality of inputs, and variable impedance means operable in response to any one of said inputs to place a low impedance shunt across at least a part of the coil means during said pulses for effectively changing the impedance of said coil means to said pulses, said core means and coil means being so related as to provide such a wide variation in the impedance of said coil means to said pulses in response to change of one of said inputs to vary said impedance from a non-shunting to a shunting condition that the power change at the load is greater than the amount of power required to vary said impedance.

13. A control system as defined by claim 12 in which said variable impedance means includes a transistor having its output connected across at least a part of the coil means, the variations in impedance of the transistor varying the impedance of the coil means to said pulses.

14. A control system as defined by claim 12 in which said variable impedance means includes a transistor having base, emitter and collector electrodes, the collector electrode and base electrode of the transistor being connected to opposite ends of at least a portion of the coil means, said plurality of inputs controlling the emitter electrode.

15. A control system as defined in claim 12 in which said variable impedance means includes a transistor having base, emitter and collector electrodes, the collector and emitter electrodes being respectively connected to opposite ends of at least a portion of the coil means, said plurality of inputs controlling the base electrode.

16. A control system as defined in claim 12 in which said variable impedance means includes a gas tube having a cathode, anode and control electrode, the anode and cathode being connected across at least a part of the coil means, said plurality of inputs controlling the base electrode.

References Cited in the file of this patent

UNITED STATES PATENTS

| | | |
|---|---|---|
| 2,021,099 | Fitz Gerald | Nov. 12, 1935 |
| 2,053,156 | Livingston | Sept. 1, 1936 |
| 2,439,561 | Cressey | Apr. 13, 1948 |
| 2,518,022 | Keister | Aug. 8, 1950 |
| 2,719,961 | Karnaugh | Oct. 4, 1955 |
| 2,729,807 | Paivinen | Jan. 3, 1956 |
| 2,734,183 | Rajchman | Feb. 7, 1956 |
| 2,774,956 | Bonn | Dec. 18, 1956 |
| 2,798,169 | Eckert | July 2, 1957 |

OTHER REFERENCES

"Magnetic and Ferro-Electric Computing Components," Newhouse, Electronic Engineering, May 1954, pages 192 to 199 (FIG. 5).